United States Patent
Mullen et al.

(10) Patent No.: US 8,560,417 B2
(45) Date of Patent: *Oct. 15, 2013

(54) PAYMENT ENTITY FOR ACCOUNT PAYABLES PROCESSING USING MULTIPLE PAYMENT METHODS

(71) Applicant: Visa U.S.A. Inc., San Francisco, CA (US)

(72) Inventors: Matthew James Mullen, Danville, CA (US); John Nicholas Marchetti, Monrovia, MD (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/627,941

(22) Filed: Sep. 26, 2012

(65) Prior Publication Data

US 2013/0138557 A1 May 30, 2013

Related U.S. Application Data

(63) Continuation of application No. 12/030,804, filed on Feb. 13, 2008, now Pat. No. 8,311,914, which is a continuation-in-part of application No. 11/929,033, filed on Oct. 30, 2007, now Pat. No. 8,407,141.

(51) Int. Cl.
*G06Q 40/00* (2012.01)
*G06Q 40/02* (2012.01)

(52) U.S. Cl.
CPC ...................................... *G06Q 40/02* (2013.01)
USPC .................. 705/35; 705/37; 705/38; 705/39; 705/44; 705/40; 705/41; 705/26

(58) Field of Classification Search
USPC ......................... 705/35, 37, 38, 39, 40, 44, 26
See application file for complete search history.

(56) References Cited

U.S. PATENT DOCUMENTS 5,790,677 A 8/1998 Fox et al.
5,826,241 A 10/1998 Stein et al.
(Continued)

FOREIGN PATENT DOCUMENTS

WO 2006/124808 A1 11/2006

OTHER PUBLICATIONS

American Express, S2S eInvoice & Pay, "The automated invoice and payment solution that drives efficiencies and cost savings", EIPSFactSheet-0707, retrieved from internet Feb. 2008, 2 pages, http://corp.americanexpress.com/gcs/s2s/einvoicepay/docs/S2S_eInvoicePay-Factsheet.pdf.

(Continued)

*Primary Examiner* — Tien Nguyen
(74) *Attorney, Agent, or Firm* — Kilpatrick Townsend & Stockton LLP

(57) ABSTRACT

A method begins by receiving an accounts payable data file from a client device. The method continues by determining whether a payables profile of a client associated with the client device is to be modified based on the accounts payable data file. The method continues by determining a level of service of the client when the payables profile is not to be modified. The method continues processing payment transactions for accounts payable contained in the accounts payable data file on behalf of the client in accordance with the payables profile via a wide area network when the level of service is a first level of service.

20 Claims, 11 Drawing Sheets

(56) References Cited

U.S. PATENT DOCUMENTS

| | | | |
|---|---|---|---|
| 5,850,446 A | 12/1998 | Berger | |
| 5,898,777 A | 4/1999 | Tycksen et al. | |
| 5,956,695 A | 9/1999 | Carrithers et al. | |
| 6,012,048 A | 1/2000 | Gustin et al. | |
| 6,032,133 A | 2/2000 | Hilt et al. | |
| 6,208,973 B1 | 3/2001 | Boyer et al. | |
| 6,292,789 B1 | 9/2001 | Schutzer | |
| 6,308,887 B1 | 10/2001 | Korman et al. | |
| 6,366,893 B2 | 4/2002 | Hannula et al. | |
| 6,408,284 B1 | 6/2002 | Hilt et al. | |
| 6,609,113 B1 | 8/2003 | O'Leary et al. | |
| 6,611,818 B1 | 8/2003 | Mersky et al. | |
| 6,704,714 B1 | 3/2004 | O'Leary et al. | |
| 6,932,268 B1 | 8/2005 | McCoy et al. | |
| 6,996,542 B1 | 2/2006 | Landry | |
| 6,999,943 B1 | 2/2006 | Johnson et al. | |
| 7,003,495 B1 | 2/2006 | Burger et al. | |
| 7,031,940 B2 | 4/2006 | Shigemi et al. | |
| 7,058,611 B2 | 6/2006 | Kranzley et al. | |
| 7,103,579 B1 | 9/2006 | Phillips et al. | |
| 7,124,937 B2 | 10/2006 | Myers et al. | |
| 7,156,294 B2 | 1/2007 | Roth | |
| 7,269,575 B1 | 9/2007 | Concannon et al. | |
| 7,313,545 B2 | 12/2007 | Degen et al. | |
| 7,321,874 B2 | 1/2008 | Dilip et al. | |
| 7,792,712 B2 * | 9/2010 | Kantarjiev et al. | 705/28 |
| 7,792,717 B1 | 9/2010 | Hankins et al. | |
| 7,930,248 B1 * | 4/2011 | Lawson et al. | 705/40 |
| 2001/0034702 A1 | 10/2001 | Mockett et al. | |
| 2001/0037209 A1 | 11/2001 | Tarbutton et al. | |
| 2002/0023053 A1 | 2/2002 | Szoc et al. | |
| 2002/0032653 A1 | 3/2002 | Schutzer | |
| 2002/0111886 A1 | 8/2002 | Chenevich et al. | |
| 2002/0111915 A1 * | 8/2002 | Clemens et al. | 705/64 |
| 2002/0111916 A1 | 8/2002 | Coronna | |
| 2002/0116331 A1 | 8/2002 | Cataline et al. | |
| 2002/0152124 A1 | 10/2002 | Guzman et al. | |
| 2002/0194138 A1 | 12/2002 | Dominguez et al. | |
| 2003/0055792 A1 | 3/2003 | Kinoshita et al. | |
| 2003/0088462 A1 | 5/2003 | Carrithers et al. | |
| 2003/0195819 A1 | 10/2003 | Chen et al. | |
| 2003/0216996 A1 * | 11/2003 | Cummings et al. | 705/39 |
| 2004/0117302 A1 | 6/2004 | Weichert et al. | |
| 2004/0128240 A1 | 7/2004 | Yusin | |
| 2004/0143527 A1 | 7/2004 | Benkert et al. | |
| 2004/0215560 A1 | 10/2004 | Amalraj et al. | |
| 2004/0230526 A1 | 11/2004 | Praisner | |
| 2005/0033609 A1 | 2/2005 | Yang | |
| 2005/0049974 A1 | 3/2005 | Jani et al. | |
| 2005/0096011 A1 | 5/2005 | Yoshida et al. | |
| 2005/0119918 A1 | 6/2005 | Berliner | |
| 2005/0177494 A1 | 8/2005 | Kelly et al. | |
| 2005/0184145 A1 | 8/2005 | Law et al. | |
| 2006/0068897 A1 | 3/2006 | Sanford et al. | |
| 2006/0074799 A1 | 4/2006 | Averyt et al. | |
| 2006/0178986 A1 | 8/2006 | Giordano et al. | |
| 2006/0206425 A1 | 9/2006 | Sharma | |
| 2006/0265298 A1 | 11/2006 | Lee et al. | |
| 2006/0266821 A1 | 11/2006 | Zajkowski et al. | |
| 2007/0016526 A1 | 1/2007 | Hansen et al. | |
| 2007/0038560 A1 | 2/2007 | Ansley | |
| 2007/0067239 A1 | 3/2007 | Dheer et al. | |
| 2007/0124224 A1 | 5/2007 | Ayers et al. | |
| 2007/0136140 A1 * | 6/2007 | Smith, Jr. | 705/26 |
| 2007/0150411 A1 | 6/2007 | Addepalli et al. | |
| 2007/0168234 A1 | 7/2007 | Rutkowski et al. | |
| 2007/0198277 A1 | 8/2007 | Philipp et al. | |
| 2007/0255669 A1 | 11/2007 | Kashanov | |
| 2007/0282743 A1 | 12/2007 | Lovelett et al. | |
| 2007/0288377 A1 | 12/2007 | Shaked | |
| 2008/0010204 A1 | 1/2008 | Rackley, III et al. | |
| 2008/0011825 A1 | 1/2008 | Giordano et al. | |
| 2008/0015985 A1 | 1/2008 | Abhari et al. | |
| 2008/0033878 A1 | 2/2008 | Krikorian et al. | |
| 2008/0086417 A1 | 4/2008 | Bykov | |
| 2008/0133407 A1 * | 6/2008 | Guillory et al. | 705/40 |
| 2008/0154769 A1 | 6/2008 | Anderson et al. | |
| 2008/0162341 A1 | 7/2008 | Zimmer et al. | |
| 2008/0235101 A1 | 9/2008 | Piepenbrink et al. | |
| 2009/0063353 A1 | 3/2009 | Viidu et al. | |
| 2009/0076953 A1 | 3/2009 | Saville et al. | |

OTHER PUBLICATIONS

Mastercard Advisors, Purchase Logic™, 2 pages.

Mastercard Worldwide, Payment Gateway, "When was the last time somebody referred to accounts payable as "A well-oiled machine"?", MPG-Buyer 01; retrieved from internet Feb. 2008, 2 pages, https://www.mastercardpaymentgateway.com/mpgpublic/pdf/buyers_sell_sheet.pdf.

Mastercard Worldwide, Payment Gateway, "There may be no shortcuts to success. But there is one to getting paid.", MPG-Supplier 0-1; retrieved from internet Feb. 2008, 2 pages, https://www.mastercardpaymentgateway.com/mpgpublic/pdf/supplier_sell$_{13}$ sheet.pdf.

* cited by examiner

Payable Profile 140

| Creditor | AP type | Payment Method | Payment Terms | Financial Inst. |
|---|---|---|---|---|
| Supplier ABC | Price ≥ X | credit card | net 30 | Bank "A" |
| | Goods – Category 1 | line of credit | - | Bank "A" |
| Supplier B | All | wire transfer | per AP | Bank "A" |
| Supplier DEF | Services – Category 1 | debit account | - | Bank "A" |
| | Services – Category 2 | check | net 30 | Bank "B" |
| | Goods – Category I | credit card | per AP | Bank "C" |
| | Goods – Category II | tangible consid. | - | Entity "A" |
| | loan payment | wire | - | Bank "A" |
| Supplier D | All for date 1 through date 2 | promissory note | - | VC "1" |
| | All goods/services after date 2 | credit card | net 30 | Bank "A" |
| | pay note | check | net 15 | Bank "B" |
| | Goods – Category "a" | account credit | - | - |
| Supplier E | All others | credit card | net 45 | Bank "B" |

FIG. 5

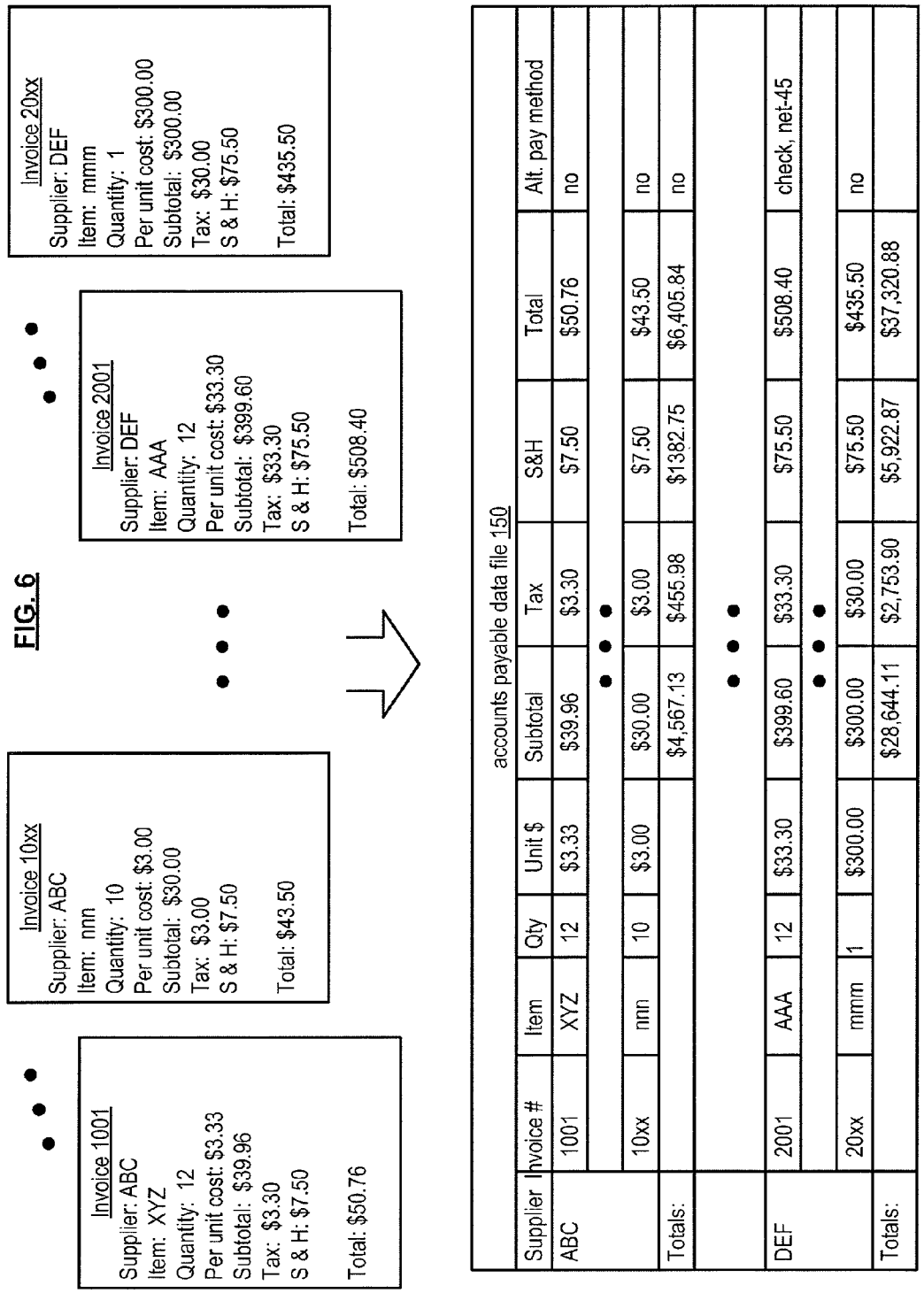

Payable Profile 140

| Creditor | AP type | Payment Method | Payment Terms | Financial Inst. |
|---|---|---|---|---|
| Supplier DEF | Services – Category 1 | debit account | - | Bank "A" |
| | Services – Category 2 | check | net 30 | Bank "B" |
| | Goods – Category I | credit card | per AP | Bank "C" |
| | Goods – Category II | tangible consid. | - | Entity "A" |
| | loan payment | wire | - | Bank "A" | accounts payable data file 150

| Supplier | Invoice # | Invoice Date | Item | Qty | Unit $ | Subtotal | Tax | S&H | Total | Alt. pay method |
|---|---|---|---|---|---|---|---|---|---|---|
| DEF | 2001 | 1/1/08 | AAA | 12 | $33.30 | $399.60 | $33.30 | $75.50 | $508.40 | check, net-45 |
| | 2002 | 1/2/08 | XXX | 12 | $3.33 | $39.96 | $3.30 | $7.50 | $50.76 | no |
| | 2003 | 1/3/08 | zzz | 10 | $3.00 | $30.00 | $3.00 | $7.50 | $43.50 | no |
| | 2004 | 1/4/08 | mmm | 1 | $300.00 | $300.00 | $30.00 | $75.50 | $435.50 | no |
| Totals: | | | | | | $769.56 | $69.60 | $166.00 | $1,038.16 | | payment data 152 for Supplier DEF

| Invoice # | AP type | Total | Payment Method | Payment Terms | Financial Inst. | Payment Date |
|---|---|---|---|---|---|---|
| 2001 | Services – Category 1 | $508.40 | *check* | *net 45* | *Bank "B"* | *2/15/08* |
| 2002 | Services – Category 2 | $50.76 | check | net 30 | Bank "B" | 2/2/08 |
| 2003 | Goods – Category I | $43.50 | credit card | per AP | Bank "C" | today |
| 2004 | Goods – Category II | $435.50 | tangible consid. | - | Entity "A" | 1/19/08 |
| | loan payment | $500.00 | wire | - | Bank "A" | today |

FIG. 7

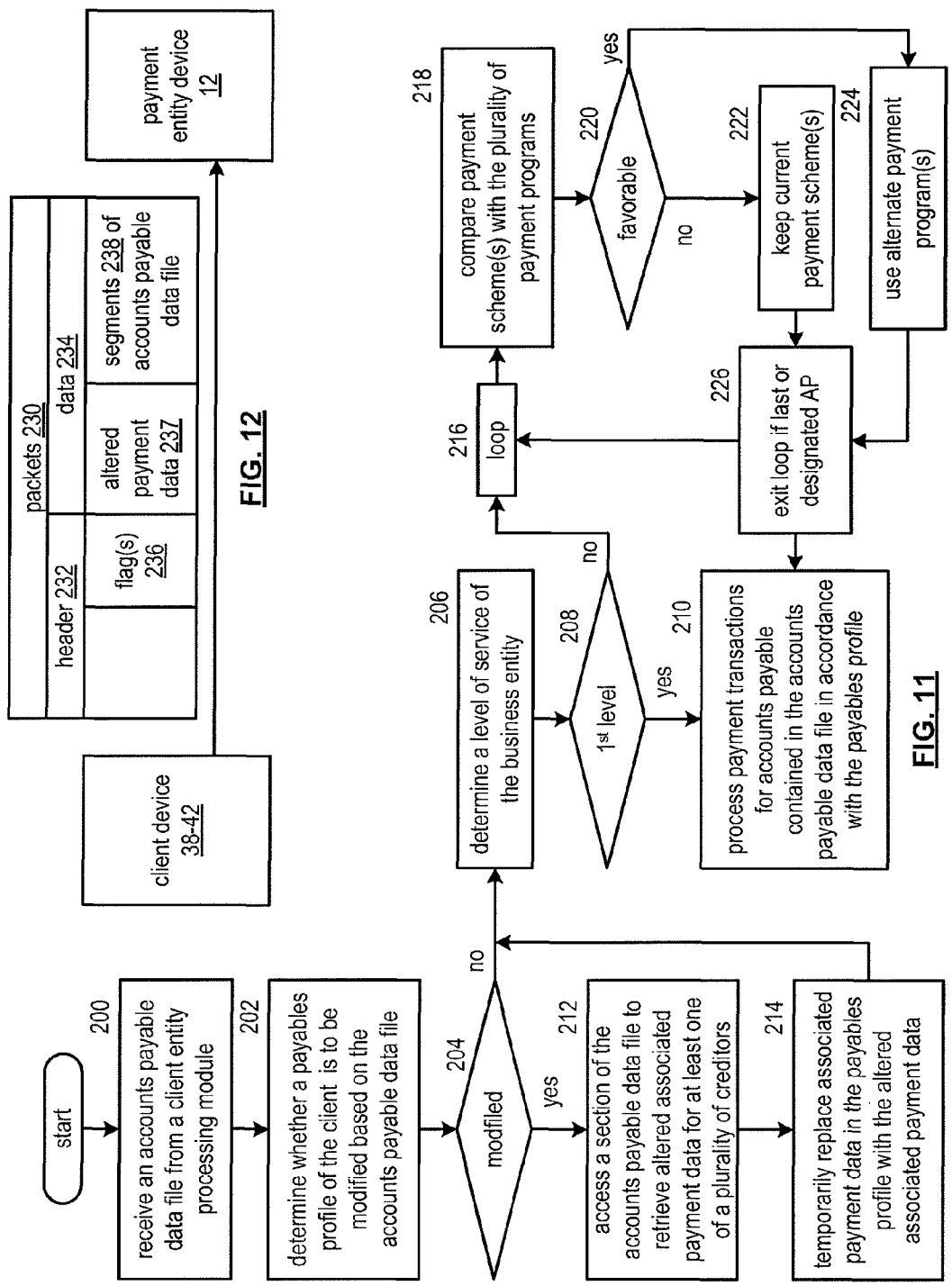

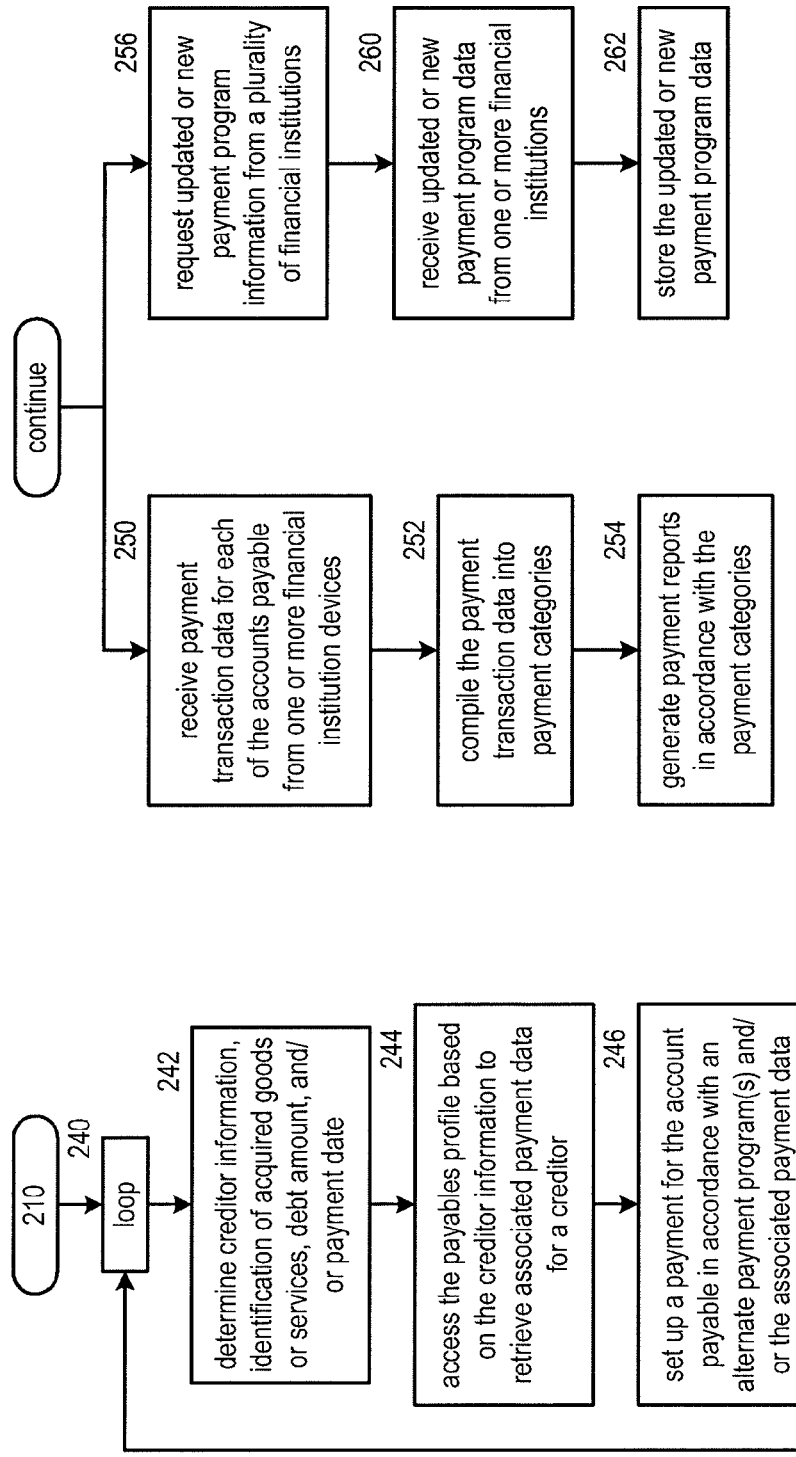

PAYMENT ENTITY FOR ACCOUNT PAYABLES PROCESSING USING MULTIPLE PAYMENT METHODS

CROSS-REFERENCE TO RELATED PATENTS

This patent application is a continuation of U.S. patent application Ser. No. 12/030,804, filed on Feb. 13, 2008, which is a continuation-in-part of U.S. patent application Ser. No. 11/929,033, filed on Oct. 30, 2007, all of which are herein incorporated by reference in their entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to communication systems and more particularly to financial transactions communication systems.

2. Description of Related Art

Millions of credit card transactions are accurately processed every day regardless of whether the purchaser is making a purchase in his/her home town, in another part of the world, or via the internet. Each transaction has a two stage process: authorization and clearing & settlement. Authorization is the process of approving or declining the transaction at the commencement of the transaction and clearing & settlement is the process of making the payment and accounting for the payment.

The authorization process begins when a point-of-sale terminal (physical for in-store purchases, virtual for internet purchases) reads a purchaser's credit card information and obtains a transaction amount. The terminal transmits the credit card information and the transaction amount to an acquirer bank, which combines the credit card information and the transaction amount into an authorization request. The acquirer bank transmits the authorization request to a proprietary transaction processing network (e.g., VisaNet®), which routes the authorization request to an issuer bank (i.e., the bank that issued the credit card). Alternatively, the proprietary transaction processing network may perform a stand-in review and authorization.

When the authorization request is sent to the issuer bank, the bank, or a designated third party, reviews the request and approves or denies it. The issuer bank transmits a response to the proprietary transaction processing network indicating its decision. The proprietary transaction processing network forwards the response to the acquirer bank, which in turn, forwards the response to the point-of-sale terminal.

The clearing & settlement process begins with clearing, which, in turn, begins when the point-of-sale terminal, or other merchant processing device, transmits sales draft information (e.g., account numbers and amounts) to the acquirer bank. The acquirer bank formats the sales draft information into a clearing message that it transmits to the proprietary transaction processing network. The network transmits the clearing message to the issuer bank, which calculates settlement obligations of the issuer bank, processing fees, and the amount due the acquirer bank. Settlement begins when the issuer bank transmits funds to a designated bank of the proprietary transaction processing network, which, after processing, transfers the funds to the acquirer bank.

In an alternate credit card transaction processing system, the proprietary transaction network is owned by a single issuer bank. Thus, in contrast with the previously described system, the alternative system includes only one issue bank, not a large number of issuer banks, and, as such, the issuer bank's functions and the proprietary transaction network functions previously discussed are merged. In this alternate system, the processing of the single issuer is less than the multiple issuer system but creates a processing bottleneck due to the single issuer.

Regardless of the type of credit card transaction processing system, such systems provides consumers, whether individuals, small companies, or large corporate entities, an easy mechanism for paying for goods and/or services. For instance, many businesses use credit cards to purchase goods and/or services from a variety of suppliers as part of their procurement and payment processes. While businesses use credit cards to purchase goods and services, they also use other forms of payment as part of their procurement and payment processes. For example, a business may purchase goods and/or services using a check, a wire transfer, and/or an automated clearing house (ACH) debit account.

Software programs have been developed to assist businesses with their procurement and payment processes. Such software programs include provisions for tracking inventory, generating purchase orders, requesting invoices, and initiating and tracking payments for the desired goods and/or services. Once a payment is initiated, depending on the type of payment, it is processed outside of the software via the appropriate system. For example, a credit card transaction is processed as discussed above. After the payment is made, it is reconciled and the reconciled payment information is provided back to the business, or to its software. While this approach reduces the burdens on a business to purchase and pay for goods and/or services, it still requires a fair amount of input from the business to initiate payments, track them, and process the reconciled data.

Recently, proprietary transaction processing network providers have partnered with procurement and payment software entities to further reduce the burdens of a business by integrating the procurement and payment software with credit card payment processing. Such integration provides relatively seamless payment for goods and/or services being purchased with a credit card. Further, in a single issuer system, the system is capable of processing payments made via a check or an ACH debit account. As such, in a single issuer system, check payments and/or ACH debit account payments may be offered to the business.

While such advancements are reducing the payment and tracking burdens of a business, they are still somewhat disjointed, still require additional business involvement, and require involvement of the supplier financial chain (e.g., merchant, merchant's bank, etc.). For instance, in the integrated credit card payment system, the business still needs to process transactions using other forms of payment, which involves the supplier financial chain. In the single issuer system, the business is limited to using a credit card issued by the provider of the single issuer system, which dramatically limits payments options.

Therefore, a need exists for a method and apparatus that provides for seamless payment for goods and/or services regardless of the type of payment and/or the type of proprietary transaction processing network.

BRIEF DESCRIPTION OF THE SEVERAL VIEWS OF THE DRAWINGS

FIG. 5 is a diagram of an example of a payables profile in accordance with the present invention;

FIG. 6 is a diagram of an example of an accounts payable data file in accordance with the present invention;

FIG. 7 is a diagram of an example of creating payment data from a payables profile and an accounts payable data file in accordance with the present invention;

FIG. 11 is a logic diagram of an embodiment of a method for processing an accounts payable data file based on a payables profile in accordance with the present invention;

FIG. 12 is a schematic block diagram of an embodiment of a client device transmitting an account payable data file to a payment entity device in accordance with the present invention;

FIG. 13 is a logic diagram of an embodiment of a method for processing payment transactions in accordance with the present invention;

FIG. 14 is a logic diagram of an embodiment of an extension of the embodiment of the method of FIG. 11 in accordance with the present invention.

DETAILED DESCRIPTION OF THE INVENTION

Figure 1:
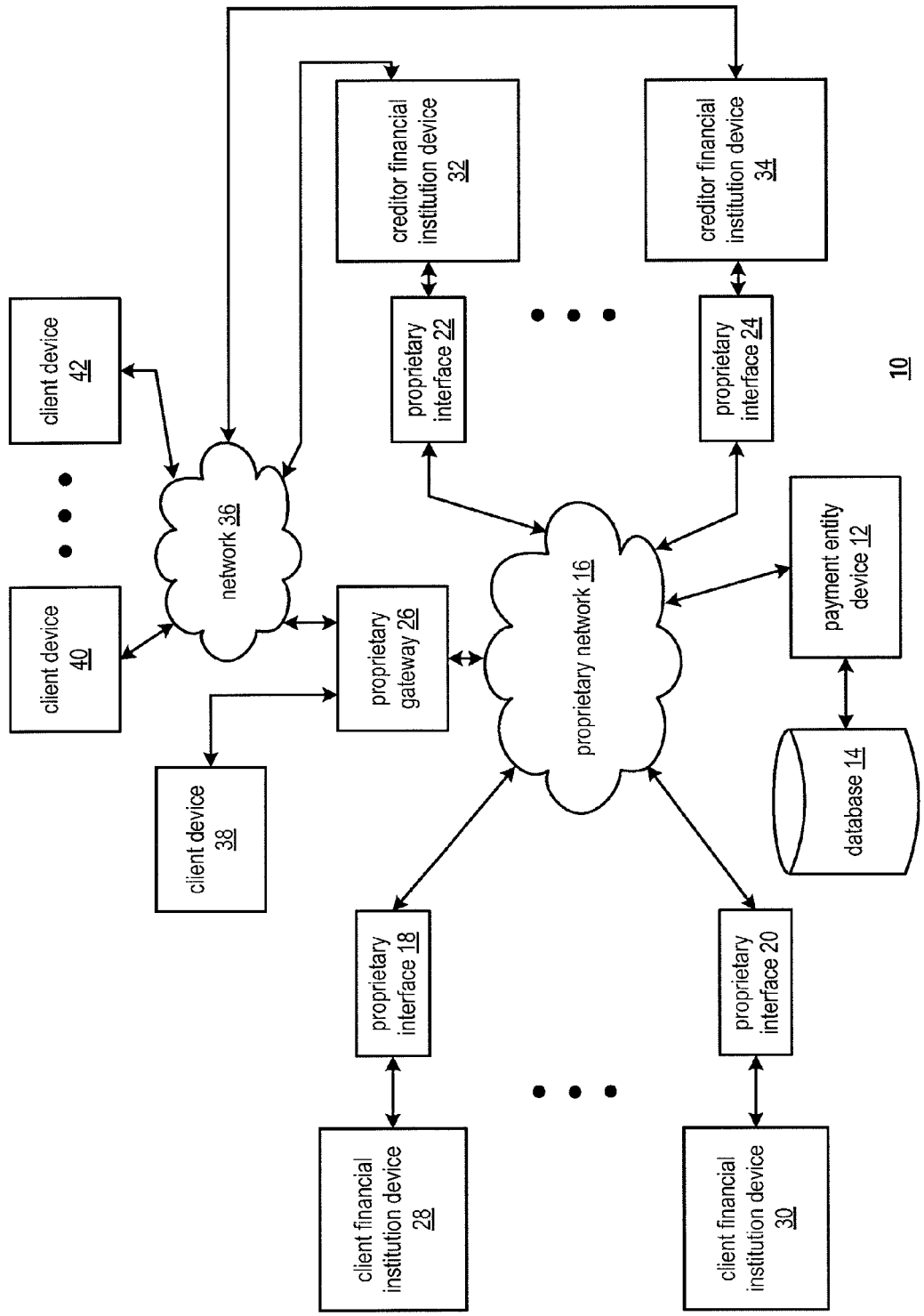
FIG. 1 is a schematic block diagram of an embodiment of a system in accordance with the present invention.

FIG. 1 is a schematic block diagram of an embodiment of a system 10 that includes a payment entity device 12, a database 14, a proprietary transaction processing network 16, a plurality of proprietary interfaces 18-24, a proprietary gateway 26, a plurality of client financial institution devices 28-30, a plurality of creditor financial institution devices 32-34, a network 36 (e.g., the internet), and a plurality of client devices 38-42.

The payment entity device 12, the database 14, and the proprietary network 16 may be operated and maintained by a single entity to facilitate seamless payment and reconciliation of accounts payable regardless of the payment method on behalf of one or more clients (e.g., individuals, businesses, agencies, and/or other entities). For example, Visa, Inc. may provide its VisaNet® as the proprietary network 16 and have one or more computing devices (e.g., computers, servers, super computers, main frames, etc.) coupled to the proprietary network 16 to function as the payment entity device 12, and may have one or more databases 14 coupled thereto.

In general, a client, via its device 38-42, establishes an account with the payment entity (e.g., Visa, Inc.), via its device 12. The account includes a level of service (basic, level 1, etc.), identity of the client and its device 38-42, and a payables profile. The payables profile includes a list of creditors (suppliers, merchants, service providers, etc.) of the client, identification information of the creditors, and one or more preferred methods of paying debt owed to a creditor.

With the account established, the payment entity is ready to provide payment and reconciliation support for the client. This function commences when the client, via its device 38-42, provides an accounts payable data file to the payment entity device 12 via the proprietary gateway 26 (and optionally the network 36) and the proprietary network 16. The proprietary gateway 26 is a proprietary node, modem, bridge, etc., that serves as a connection point to the proprietary network 16, which ensures that only authorized entities have access to the proprietary network 16. Note that communications within the system 10 occur in accordance with the communication protocol (e.g., internet protocol, transmission control protocol, and/or a proprietary version thereof) of the proprietary network 16.

Upon receiving the accounts payable data file, the payment entity device 12 retrieves the payables profile of the client, which may be stored in the database 14. The payment entity device 12 determines a method of payment (e.g., credit card [e.g., credit card, debit card, charge card, stored-value card, prepaid card, Electronic Benefit Transfer card, card account and other types of issued cards or accounts], funds transfer [e.g., wire transfer, account transfer within same financial institution, etc.], commercial paper [e.g., check, promissory note, etc.], tangible consideration [e.g., rebate, refund, goods and/or service exchange, etc.], debit account [e.g., ACH, line or credit, etc.], and credit card [e.g., business, debit card, auto pay, single use, etc.]), amount of payment, payment date, and terms of payment for each account payable in the accounts payable data file based on the payables profile. Alternatively, for an account payable, the payment entity device 12 may determine a different method of payment that is more optimal (e.g., less costly to process, better payment terms, rebate offer, rewards offer, etc.) for the client.

For a given account payable, the payment entity device 12 initiates a payment on behalf of the client in accordance with the method of payment, the amount of payment, the payment date, and the payment terms by sending a payment request to a client financial institution device 28-30 that corresponds to the type of payment (e.g., issuer bank for a credit card payment, a bank for check payment, a bank for wire transfer, etc., which may be the same or different banks).

The client financial institution device 28-30 processes the payment request in accordance with the type of payment. For example, if the type of method is a credit card payment, the client financial institution device 28-30 assists in the clearing and settlement process with the creditor's financial institution device 32-34. As another example, if the type of payment is a check, the client financial institution device 28-30 determines whether the client has sufficient funds in its account to cover the amount due. If yes, the client financial institution device 28-30 generates a check, sends it to the creditor, and generates a transaction completed message, which includes the check number, amount, creditor, payment date, etc. The client financial institution device 28-30 sends the transaction complete message to the payment entity device 12.

The payment entity device 12 monitors the payments of the accounts payable, collects the payment responses from the various financial institution devices 28-30 and 32-34, reconciles payments of the accounts payable, and generates reports thereof. As an example, the payment entity device 12 generates a client statement report that indicates how and when the accounts payable have been paid. In this manner, the client, after setting up an account, merely transmits an accounts payable data file to the payment entity device 12 and receives a statement when the accounts are paid, with little or no interaction to facilitate the payments regardless of the payment type.

Figure 2:
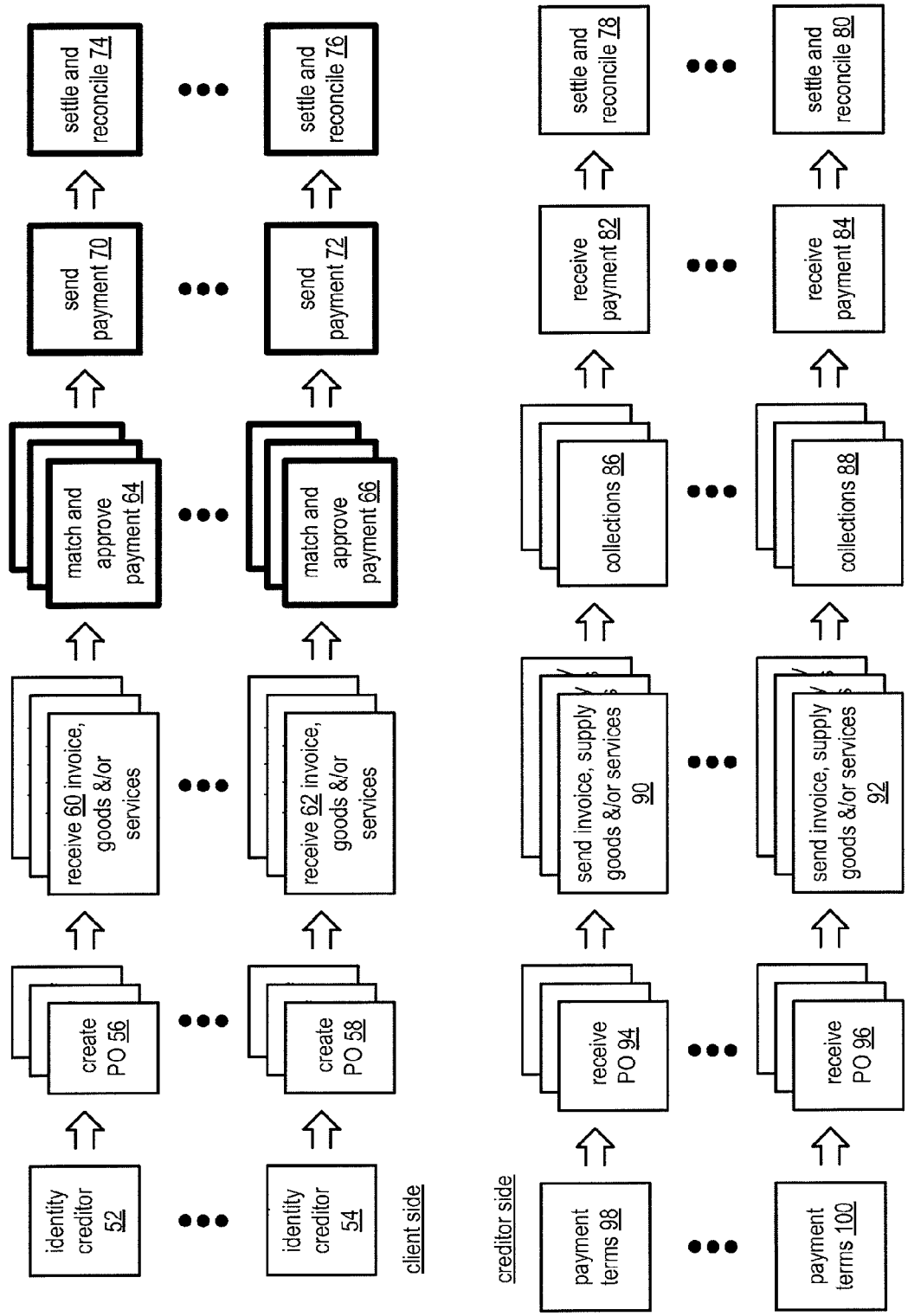
FIG. 2 is a diagram of an example of a payment and procurement process in accordance with the present invention.

FIG. 2 is a diagram of an example of a payment and procurement process that includes a client side and a creditor side. The client side includes identifying creditors (e.g., supplier, service provider, merchant, loan service, line of credit service, etc.) 52-54, creating purchase orders (PO) 56-58, receiving invoice for goods and/or services 60-62 per purchase order, match and approve payment 64-66 per purchase order, send payment 70-72 per purchase order or creditor, and settle and reconcile 74-76 each payment. The creditor side includes establish payment terms 98-100 for a client, receive purchase orders 94-96, send invoice for goods and/or services 90-92, generate collections (e.g., accounts receivable) 86-88, receive payments 82-84 for each purchase order or from a given client, and settle and reconcile payments 78-80. Note that the system of FIG. 1 supports the match and approve payment step 64-66, the send payment step 70-72, and/or the settle and reconcile step 74-76.

Figure 3:
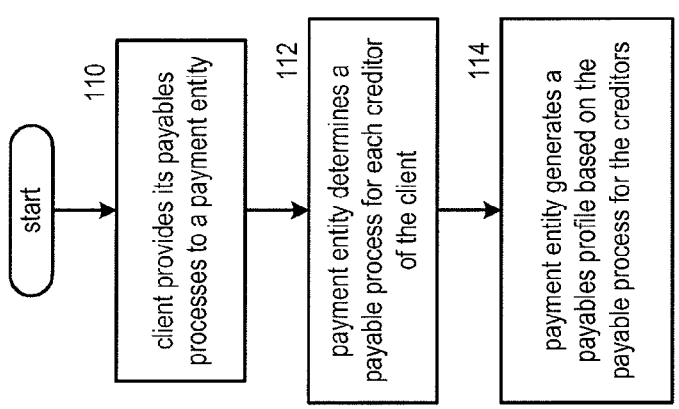
FIG. 3 is a logic diagram of an embodiment of a method for creating a payables profile in accordance with the present invention.

FIG. 3 is a logic diagram of an embodiment of a method for creating a payables profile that begins at step 110 where a client device 38-42 provides the client's payable processes to the payment entity device 12. The client's payables processes include identity of a creditor and, for each creditor, one or more preferred methods of payment (e.g., credit card, funds transfer, commercial paper, tangible consideration, debit account, and credit card), preferred payment terms, and identity of client's corresponding financial institution. Note that the client's payables processes may include more or less data. Further note that client's payables processes may include default information. For example, the default information may indicate a particular payment type for any non-specified creditor, may indicate a particular payment type for certain types of transactions regardless of creditor, may indicate a particular payment type for transactions greater than a certain value and another for transactions less than the certain value, may indicate, for a given payment type, to use a particular client financial institution, and/or may indicate to have the payment entity device to determine the payment method and/or client financial institution. As such, the client can provide as specific or as vague of guidelines as it desires as to how, when, and in what way its debts are to be paid.

The method then proceeds to step 112 where the payment entity determines a payables process for each creditor of the client based on the client's payables processes. For example, if the client provided a specific payables process for a specific creditor, then the payment entity stores this information for the specific creditor. As another example, if the client did not provide a specific payables process for a creditor, the payment entity may assign the default payment process or a payment entity identified payment process for the creditor. The method then proceeds to step 114 where the payment entity generates a payables profile for the client based on the payables processes for the creditors.

Figure 4:
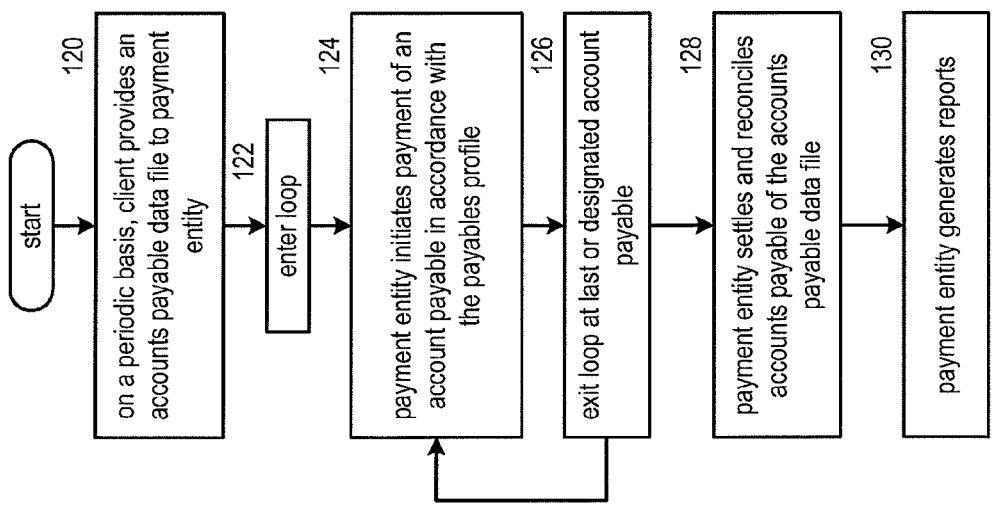
FIG. 4 is a logic diagram of an embodiment of a method for paying accounts payable in accordance with the present invention.

FIG. 4 is a logic diagram of an embodiment of a method for paying accounts payable that begins at step 120 where, on a periodic basis (e.g., weekly, bi-monthly, monthly, when initiated by the client), the client device 38-42 provides an accounts payable data file to the payment entity device 12. In an embodiment, the accounts payable data file includes, at a minimum, invoices from creditors of the client. The invoices may be arranged into a tabular form, or other form, and sorted based on creditor, item purchased, dollar amount, method of payment, and/or any other data point.

The method continues at step 122, where the payment entity device 12 enters a loop. Within the loop, the payment entity device 12 initiates a payment of an account payable in accordance with the payables profile at step 124. For example, for a given accounts payable, which may correspond to a single invoice from a given creditor or a group of invoices from the creditor, the payment entity device 12 accesses the payables profile with respect to the creditor. Based on the payment preferences specified in the payables profile, the payment entity device 12 generates a payment request and sends to the appropriate client financial institution. The payment entity device 12 remains in the loop unit the last or a designated account payable is reached at step 126. For example, the designated account payable may correspond to a cumulative total of payments being exceeded, a certain number of creditors, etc. Note that the payment initiation is being done without involvement of the creditor's financial institution as is typical in credit card transactions.

The method then continues at step 128 where the payment entity device settles and reconciles the accounts payable. For example, the payment entity device 12 receives payment notifications from the client's financial institutions, stores the payment notifications, and reconciles the payment notifications with the accounts payable. The method then continues at step 130 where the payment entity device 12 generates reports regarding the payment of the accounts payable. The payment entity device 12 may generate a report for the client, for itself, for the client's financial institution(s), and/or the creditor's financial institution(s).

FIG. 5 is a diagram of an example of a payables profile 140 that includes a plurality of fields. The fields may include more or less of a creditor field, an accounts payable type field, a payment method field, a payment terms field, and a financial institution field. In an embodiment, the payment entity device 12 stores, for the creditors of the client, the preferred payment method, payment terms, and financial institution for various types of accounts payable. The preferences may be provided by the client without input from the payment entity, may include input from the payment entity, or derived by the payment entity.

As shown for a given creditor, accounts payable may be grouped and have different payment preferences. For example, Supplier ABC has two groupings of accounts payable type: the first being any goods and/or services that have a purchase price greater than a specified price and goods in category 1. The specified price could be a per-item price or a cumulative price. For goods and/or services that exceed this price, the preferred payment method is a credit card, which should be paid net-30 from the date of an invoice, and to use one or more of the credit cards the client has that is/are issued from Bank "A".

For goods that fall into category 1 (e.g., office supplies, etc.), the preferred method of payment is a line of credit with Bank "A". In the case where goods of category 1 are purchased and exceed the price threshold, a hierarchical approach may be applied to determine which payment method to use. For example, in this instance, use the first preferred method.

For all other goods and/or services that are not within category 1 and have a price less than the threshold, the payment entity device 12 will use a default payment approach.

The client may specify the default method or the payment entity device 12 may determine the default method.

As another example, Supplier B has indicated that all of its accounts payables are to be paid using a wire transfer, with payment terms it specifies in the account payable data file, and the funds should come from Bank "A". As yet another example, Supplier DEF has numerous account payable categories, each with a different payment preference. As shown, services of category 1 are to be paid using a debit account, services of category 2 are to be paid using a check, goods of category 1 are to be paid using a credit card, goods of category 2 are to be paid with tangible consideration (e.g., a credit, exchange of goods and/or services, etc.), and a loan payment is to be made using a wire transfer.

As a further example, Supplier D has two classifications for its accounts payable: one for accounts payable incurred between a first and second date and a second for accounts payable incurred subsequent to the second date. In this example, all accounts payable incurred between the first and second dates are to be paid using a promissory note from a venture capitalist (VC) "1". For accounts payable incurred after the second date, a credit card is to be used. Also, payments on the promissory note are to be made using a check from an account with Bank "B".

FIG. 6 is a diagram of an example of an accounts payable data file 150 created from a plurality of invoices. In an embodiment, the invoices may stored and provided as the accounts payable data file 150. In another embodiment as shown, the invoices are tabulated to create the data file 150.

In this example, each invoice includes supplier identification information (e.g., name, address, creditor's financial institution, etc.), the items purchased, the quantity of items purchased, the unit cost of the items purchased, a subtotal, taxes, shipping and handling, and a total. On a per creditor basis, or some other basis (e.g., amount, item, etc.), the data is tabulated. In addition, the accounts payable data file may include an additional field to indicate with a particular account payable is to be paid in accordance with the payable profile or with an alternate payment process. In this example, invoice 2001 is to be paid using a check with a net-45 payment term.

FIG. 7 is a diagram of an example of creating payment data 152 from a payables profile 150 and an accounts payable data file 140 for a given creditor (e.g., supplier DEF). The payables profile 140 is a repeated from FIG. 5 for Supplier DEF and the account payable data file 150 is repeated from FIG. 6 for Supplier DEF with the addition of invoices 2002 and 2003. From these two data files, the payment entity device 12 generates the payment data 152, which is used to create payment requests that are sent to the appropriate financial institutions of the client.

For example, with respect to invoice 2001, the processing entity device 12 reviews the accounts payable data file 150 for this invoice to identify the invoice date, the item purchased, the purchase price, tax, shipping & handling, and if an alternate payment method is indicated. In this instance, there is an alternate payment method. As such, for invoice 2001, the payment entity device 12 generates the payment data to include the invoice number (e.g., 2001), the invoice date (e.g., 1/1/08), the item (e.g., AAA), the account payable type (e.g., Services—Category 1), the total price (e.g., $508.40, assuming tax and shipping & handling costs are being paid along with the purchase prices and not being paid using a different payment method), the payment method (e.g., check per the accounts payable file instead of a debit account as indicated in the payables profile), the payment terms (e.g., net 45 per the accounts payable data file), the financial institution identity (e.g., Bank "B" per the accounts payable data file instead of Bank "A" per the payables profile), and the payment date (e.g., 2/15/08, 45 days from the invoice date).

As another example, with respect to invoice 2002, the processing entity device 12 reviews the accounts payable data file 150 for the relevant information. In this instance, there is no alternate payment method. As such, for invoice 2002, the payment entity device 12 generates the payment data to include the invoice number (e.g., 2002), the invoice date (e.g., 1/2/08), the item (e.g., XXX) the account payable type (e.g., Services—Category 2), the total price (e.g., $50.76, assuming tax and shipping & handling costs are being paid along with the purchase prices and not being paid using a different payment method), the payment method (e.g., check per payables profile), the payment terms (e.g., net 30 per the payables profile), the financial institution identity (e.g., Bank "B" per the payables profile), and the payment date (e.g., 2/2/08, 30 days from the invoice date).

The payment entity device 12 generates the payment data 152 for invoice 2003 and 2004 in a similar manner as it generated the payment data 152 for invoice 2001. Note that since the payables profile and the accounts payable data file did not indicate payment terms for goods ZZZ purchase via invoice 2003, the payment entity device 12 initiates payment on a date it selects. In this example, the payment entity device 12 was programmed to select the date on which the data is compiled, however, it could be programmed to select any date or interval from the corresponding invoice date.

In this example, the payment entity device 12 also generates payment data 152 for a loan that the client has with Supplier DEF. The loan could be a line of credit, a loan, or some other form of monetary advancement. The payment data 152 for the loan indicates that $500.00 is to be wired from Bank "A" to Supplier DEF's account on the date the data is created.

Figure 8:
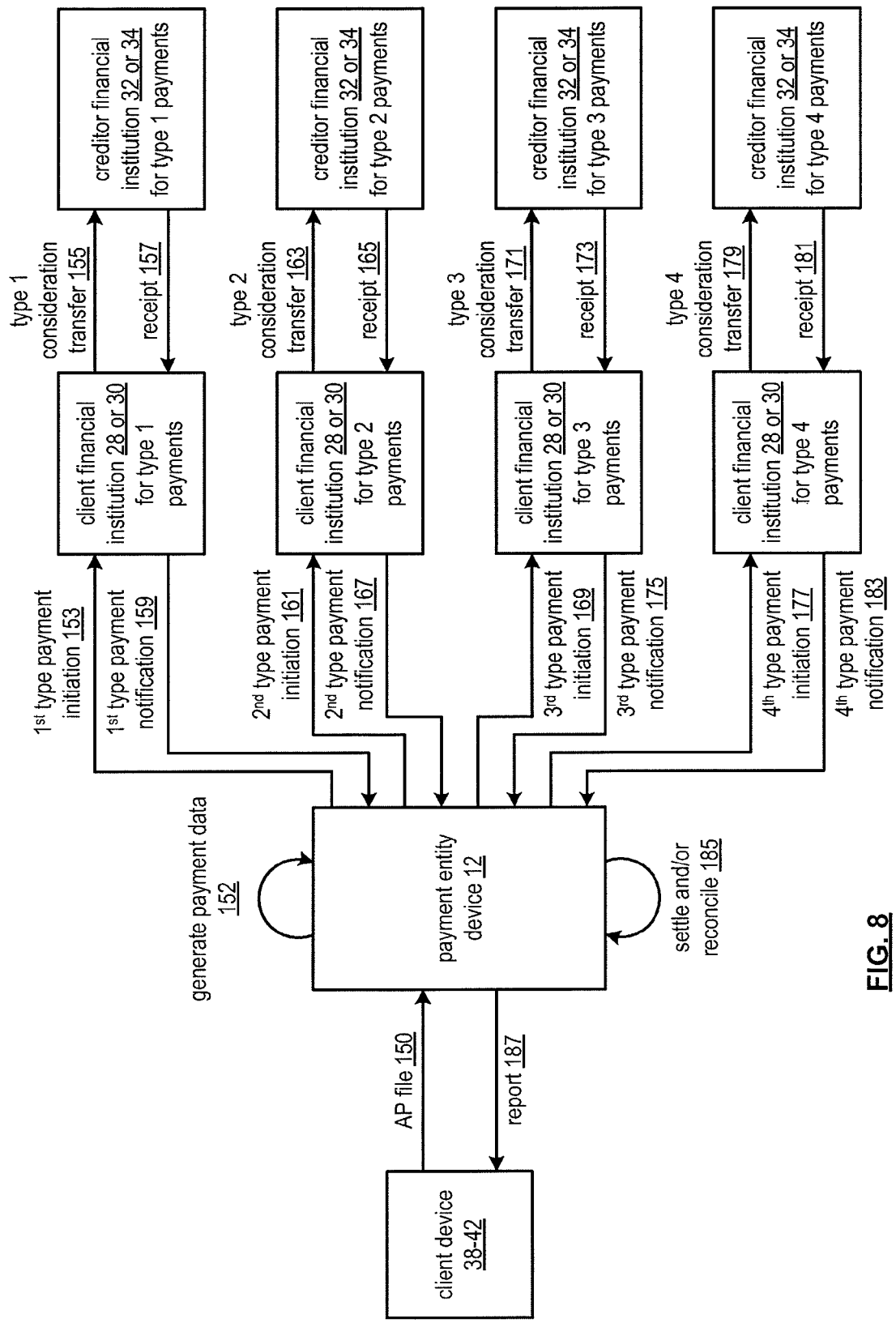
FIG. 8 is a schematic block diagram of an example of payment of accounts payable via a system in accordance with the present invention.

FIG. 8 is a schematic block diagram of an example of payment of accounts payable via the system 10 of FIG. 1. In this example, the client device 38-42 transmits an accounts payable data file 150 to the payment entity device 12. The payment entity device 12 processes the account payable data file 150 in accordance with the payables profile 140 for the client to generate the payment data 152.

The payment entity device 12 analyzes the payment data 152 on an per entry basis to determine a type of payment (e.g., credit card, funds transfer, commercial paper, tangible consideration, or debit account). When the type of payment is a first type, the payment entity device 12 transmits a $1^{st}$ type payment initiation request 153 to a client financial institution 28 or 30 that processes the $1^{st}$ type of payments. Assuming the payment is approved, the client financial institution 28 or 30 transfers the $1^{st}$ type of consideration 155 (e.g., funds transfer, check, line of credit, etc.) to a creditor financial institution 32 or 34 that processes the first type of payment. Upon crediting the $1^{st}$ type of consideration to the appropriate creditor's account, the creditor's financial institution 32 or 34 transmits a receipt of payment 157 to the client financial institution 28 or 30. The client financial institution 28 or 30 processes the receipt 157 to produce a $1^{st}$ type of payment notification 159. The client financial institution transmits the notification 159 to the payment entity device 12.

When the type of payment is a second type, the payment entity device 12 transmits a $2^{nd}$ type payment initiation request 161 to a client financial institution 28 or 30 that processes the $2^{nd}$ type of payments. Assuming the payment is approved, the client financial institution 28 or 30 transfers the $2^{nd}$ type of consideration 163 (e.g., funds transfer, check, line of credit, etc.) to a creditor financial institution 32 or 34 that processes the second type of payment. Upon crediting the $2^{nd}$ type of consideration to the appropriate creditor's account, the creditor's financial institution 32 or 34 transmits a receipt of payment 165 to the client financial institution 28 or 30. The client financial institution 28 or 30 processes the receipt 165 to produce a $2^{nd}$ type of payment notification 167. The client financial institution transmits the notification 167 to the payment entity device 12.

When the type of payment is a third type, the payment entity device 12 transmits a $3^{rd}$ type payment initiation request 169 to a client financial institution 28 or 30 that processes the $3^{rd}$ type of payments. Assuming the payment is approved, the client financial institution 28 or 30 transfers the $3^{rd}$ type of consideration 171 (e.g., funds transfer, check, line of credit, etc.) to a creditor financial institution 32 or 34 that processes the third type of payment. Upon crediting the $3^{rd}$ type of consideration 171 to the appropriate creditor's account, the creditor's financial institution 32 or 34 transmits a receipt of payment 173 to the client financial institution 28 or 30. The client financial institution 28 or 30 processes the receipt 173 to produce a $3^{rd}$ type of payment notification 175. The client financial institution transmits the notification 167 to the payment entity device 12.

When the type of payment is a fourth type, the payment entity device 12 transmits a $4^{th}$ type payment initiation request 177 to a client financial institution 28 or 30 that processes the $4^{th}$ type of payments. Assuming the payment is approved, the client financial institution 28 or 30 transfers the $4^{th}$ type of consideration 179 (e.g., funds transfer, check, line of credit, etc.) to a creditor financial institution 32 or 34 that processes the fourth type of payment. Upon crediting the $4^{th}$ type of consideration 179 to the appropriate creditor's account, the creditor's financial institution 32 or 34 transmits a receipt of payment 181 to the client financial institution 28 or 30. The client financial institution 28 or 30 processes the receipt 181 to produce a $4^{th}$ type of payment notification 183. The client financial institution transmits the notification 183 to the payment entity device 12. Note that the client financial institution that processes the first, second, third, and fourth types of payments may be the same financial institution, different institutions, or multiple financial institutions with at least one processing at least two types of payments. For example, a client may have a checking account and credit card with a first bank and having a line of credit and a debit account from a second bank.

As the payment entity device 12 receives the notifications 159, 167, 175, and/or 183, it stores them and processes 185 them to settle and reconcile the accounts payable. When this process is complete, or at any desired level of completion (e.g., on a per accounts payable basis up to all of the accounts payable in the accounts payable data file 150), the payment entity device 12 generates a report 187 regarding payment of the accounts payable and sends it to the client device 38-42. In such a system, the client sends its accounts payable information to the payment entity, which handles the payment, tracking, and reporting of paying the accounts payable with little or no further involvement of the client.

Figure 9:
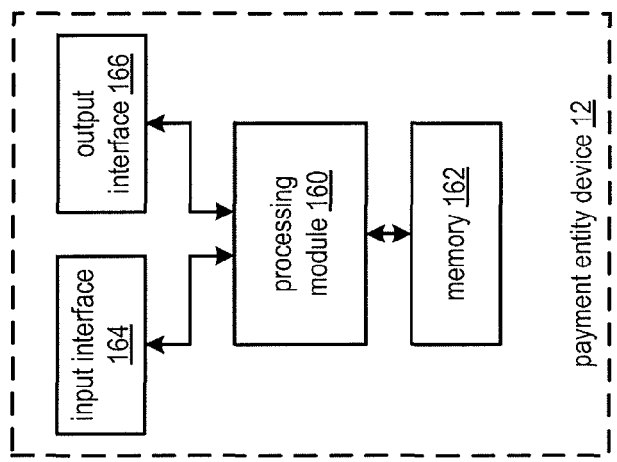
FIG. 9 is a schematic block diagram of an embodiment of a payment entity device in accordance with the present invention.

FIG. 9 is a schematic block diagram of an embodiment of a payment device 12 that includes a processing module 160, memory 162, an input interface 164, and an output interface 166. In an embodiment, the payment entity device 12 is a computer or similar processing device. In such an embodiment, the processing module 160 includes a central processing unit; the memory 162 includes system memory, cache memory, and read only memory; the input interface 164 includes a graphical user interface and/or a peripheral device interface (e.g., to connect to a mouse, a keyboard, etc.); and the output interface 166 includes a video card, printer card, etc. Note that, while not shown, the payment entity device 12 includes a network interface module such that it can access the proprietary network 16.

In general, the processing module 160 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 160 may have internal memory and/or is coupled to memory 162. Memory 162 and internal memory may each be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the internal memory and/or memory 162 stores, and the processing module 160 executes, hard coded and/or operational instructions corresponding to at least some of the steps and/or functions illustrated in FIGS. 1-15.

Figure 10:
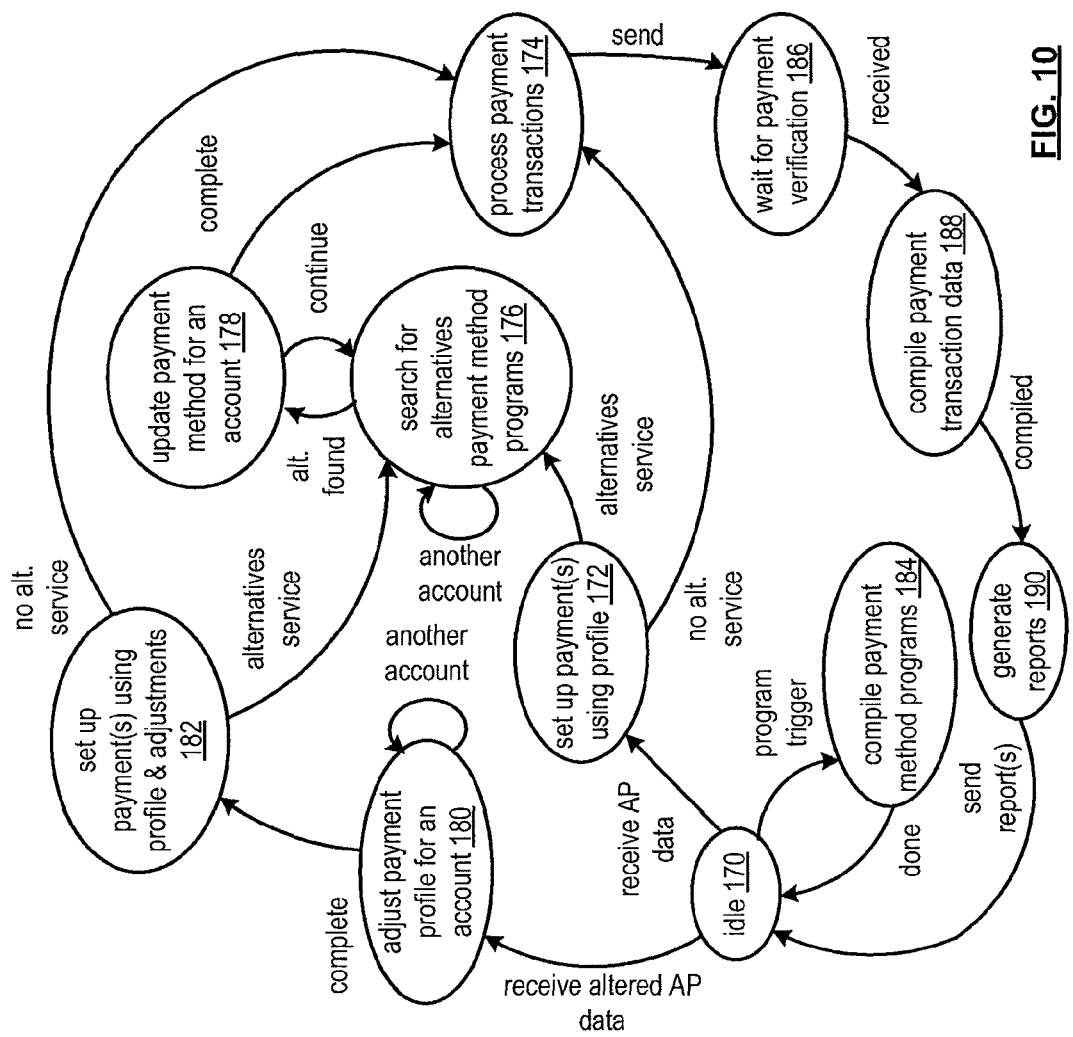
FIG. 10 is a state diagram of an embodiment of processing an accounts payable data file based on a payables profile in accordance with the present invention.

FIG. 10 is a state diagram of an embodiment of processing an accounts payable data file based on a payables profile where the payment entity device begins in an idle state 170. The payment entity device transitions from the idle state 170 when it receives an accounts payable data file. If the accounts payable data file includes one or more alternate payment methods for one or more creditors, the payment entity device transitions to an adjust payment profile for an account state 180. If the accounts payable data file does not include alternative payment methods, the payment entity device transitions to the set up payments using the payables profile state 172.

In state 172, the payment entity device retrieves the payables profile for the client and, for each account payable in the accounts payable data file, sets up a payment based on information contained in the payables profile. The setting up of a payment includes determining the identity of the creditor, determining the creditor's account information, determining an amount owed to the creditor, the goods and/or services purchased from the creditor, determining invoice number, determining invoice date, determining a payment date, determining a payment method, and determining other payment terms. For example, an account payable in the data file identifies creditor ABC and that client owes $500.00 for the purchase of product 123. From this information, the payment entity device indexes the payables profile to retrieve payment information. For example, the payables profile may indicate that, for creditor ABC, all debt owed is to be paid by wire transfer, net 30 days. As such, the payment entity device would set up a payment for creditor ABC using a wire transfer for $500.00, 30 days from the invoice date. A more detailed example was discussed with reference to FIG. 7.

Once the payment entity device has set up the payments for the accounts payable, or while it is setting up payments, the payment entity device determines whether the client has subscribed for alternative services. If not, the payment entity transitions to a process payment transaction state 174 once it has completed setting up the payments. If the client has subscribed to the alternate services, the payment entity device transitions to a search for alternate payment method program state 176.

In state 176, the payment entity device searches for alternate payment methods for each payment, or at least some of the payments, set up in state 172. In this state, the payment entity device is comparing the payment method set up for an account payable with a plurality of payment method programs to determine if one or more of the payment method programs provide a more optimal payment solution (e.g., lower transactional fee, better payment terms, better bonuses, better rewards, volume discounts, lower interest rates, etc.). For each account payable that has a more optimal payment method, the account payable is flagged and the more optimal payment method is stored for the account payable. When the payment entity device has compiled the optimal payment methods for the accounts payable of the accounts payable data file, it transitions to state 178.

In state 178, the payment entity device updates the payment set up for each account payable having an optimal payment method in accordance with the level of services subscribed to by the client. For example, if the client has subscribed to an automatic update service, the payment entity device updates the payment set up for each account payable having a more optimal payment method with the more optimal payment method. As another example, if the client has subscribed to a notification first service, the payment entity device provides the more optimal payment methods to the client device. The client device then responds with which more optimal payment methods to use, if any. Once the payment entity device knows which accounts payable are to be paid using it corresponding more optimal payment method, the payment entity device updates the payment set up using the more optimal payment method and transitions to state 174. Note that the payment entity device does not change the payables profile in light of the more optimal payment method for a given creditor unless making a change is part of the service subscribed to by the client.

In state 174, the payment entity device processes payment transactions from the payment set up information. The processing of the payment transaction includes, but is not limited to, generating a message to a financial institution of the client requesting payment of the amount owed to a creditor and transmitting the message. The message includes the client information (e.g., name, account number, security information, etc), the amount owed, the creditor information (e.g., name, account number, etc.), the method of payment (e.g., check, wire transfer, debit account, credit card, etc.), a payment date, and additional payment terms. The message is transmitted via the proprietary network as shown in FIG. 1. After the payment transaction messages are sent, the payment entity device transitions to a wait for payment verification state 186.

If, when the payment entity device is in the idle state and the received accounts payable data file includes one or more alternate payment methods for one or more creditors, the payment entity device transitions to an adjust payment profile for an account state 180. At state 180, the payment entity device adjusts the payment profile for a given account. This may be done for the current processing of the account payable or a permanent change to the payables profile as indicated in the accounts payable data file. The adjusting of the payment profile includes temporarily or permanently replacing the accounts payable type, the payment method, payment terms, financial institution, etc. for a given creditor in the payables profile with an alternate accounts payable type, an alternate payment method, alternate payment terms, and/or an alternate financial institution. Once the payment entity device has adjusted the payment profile for each account payable requiring adjusting, the payment entity device transitions to state 182.

In state 182, the payment entity device sets up a payment for each account payable based on information contained in the payables profile or the adjusted payment profile. The setting up of a payment includes determining the identity of the creditor, determining the creditor's account information, determining an amount owed to the creditor, the goods and/or services purchased from the creditor, determining invoice number, determining invoice date, determining a payment date, determining a payment method, and determining other payment terms.

Once the payment entity device has set up the payments for the accounts payable in state 182, or while it is setting up payments, the payment entity device determines whether the client has subscribed for alternative services. If not, the payment entity transitions to a process payment transaction state 174 once it has completed setting up the payments. If the client has subscribed to the alternate services, the payment entity device transitions to a search for alternate payment method program state 176.

The payment entity device transitions from state 186 to a compile payment transaction data state 188 when it receives payment verification messages. In state 188, the payment entity device compiles and reconciles the payment verifications with the accounts payable. When this is complete, the payment entity device transitions to a generate report state 190. In state 190, the payment entity device generates one or more reports for the client, the client's financial institution, the payment entity, etc. The payment entity device transmits the reports and then transitions back to the idle state 170.

In addition to the various states above for processing payments, the payment entity device may periodically transition into a compile payment method program state 184. In this state, the payment entity device communicates with a plurality of financial institutions to acquire new, modified, or deleted payment programs they are offering. For each new, modified, or deleted payment program, the payment entity device updates its list of payment method programs.

FIG. 11 is a logic diagram of an embodiment of a method for processing an accounts payable data file that begins at step 200 where the payment entity device receives an accounts payable data file from a client device. An example of an accounts payable data file is provided with reference to FIG. 6. The method continues at step 202 where the payment entity device determines whether a payables profile of a client associated with the client device is to be modified based on the accounts payable data file. This may be done by evaluating a preamble field of the accounts payable data file for an indication that the accounts payable data file includes altered associated payment data for at least one of a plurality of creditors. An example of this will be discussed in greater detail with reference to FIG. 12.

The method branches at step 204 to step 206 when the payables profile is not to be modified and to step 212 when it is to be modified. At step 206, the payment entity device determines a level of service of the client. The method branches at step 208 when the level of service is a first level of service to step 210 and to step 216 when the level of service is not the first level. At step 210, the payment entity device processes payment transactions for accounts payable contained in the accounts payable data file on behalf of the client in accordance with the payables profile via a wide area network. For example, for each account payable, the payment entity sets up a payment, transmits a payment message to an appropriate financial institution to initiate the payment, and waits for notification of payment.

If, at step 204, the payables profile is to be modified, the method proceeds to step 212 where the payment entity device accessing a section of the accounts payable data file to retrieve altered associated payment data for at least one of the client's creditors. The method then proceeds to step 214 where the payment entity device temporarily replaces the associated payment data (e.g., at least one of accounts payable type, the payment method, payment terms, financial institution, etc.) in the payables profile with the altered associated payment data. The associated payment data includes at least one payment scheme for paying at least a portion of debt owed to the one of the plurality of creditors via at least one of: a client credit card, a funds transfer, commercial paper, tangible consideration, and a debit account. Note that the client may indicate via the preamble field that the altered payment data should permanently replace the payment data in the payables profile.

If, at step 208, the level of service is not the first level, the method continues at step 216 where the payment entity device enters a loop. Within the loop, the method continues at step 218 where the payment entity device compares the at least one payment scheme with a plurality of payment programs. For example, the payment entity device is comparing the payment scheme or profile for a particular creditor with a list of payment programs offered by one or more financial institutions. If one or more of the payment programs offers a more optimal payment scheme (e.g., lower transaction fee, lower interest rate, better bonuses, better rewards program, better payment terms, etc.) than is currently being used, the payment entity device indicates a favorable comparison.

The method branches at step 220 to step 224 when the comparison was favorable and to step 222 when the comparison was unfavorable. At step 224, the payment entity device utilizes one or more of the payment programs instead of the payment scheme of the payables profile to initiate payment of a corresponding accounts payable. At step 222, the payment entity device utilizes the current payment scheme of the payables profile to initiate payment of the corresponding accounts payable. The method continues at step 226 where the payment entity device exits the loop when the last or a designated account payable (e.g., a certain number of accounts payable have been processed, a predetermined period of time has elapsed since receiving the accounts payable data file, etc.) of the accounts payable data is processed, otherwise the payment entity device repeats the loop for the next account payable in the accounts payable data file.

FIG. 12 is a schematic block diagram of an embodiment of a client device 38-42 transmitting an account payable data file in packets, and/or frames, 230 to a payment entity device 12. The packetizing and/or framing of the data file will done in accordance with the communication protocol or protocols of the proprietary network 16. In an embodiment, a packet 230 will include a header portion 232 and a data portion 234. The header portion 232 will include overhead transmission data corresponding to the various protocol layers of a network protocol (e.g., the seven layers (physical, data link, network, transport, session, presentation, and application) of the Open Systems Interconnection model or proprietary version thereof). In addition, the header portion 232 includes one or more flag fields 236 to indicate whether one or more accounts payable of the accounts payable data file includes an alternate payment profile, or scheme.

The data portion 234 includes a field for segments 238 of the accounts payable data file as partitioned per the network protocol. The data portion 234 may further include a field for altered payment data 237 (i.e., the alternate payment profile, method, or scheme). The payment entity device 12 receives the packets 230 and, in accordance with the network protocol, recreates the accounts payable data file and any altered payment data. Note that the payment entity device 12 interprets the flags field 236 to determine whether the packets 230 include the altered payment data 237.

FIG. 13 is a logic diagram of an embodiment of a method for processing payment transactions as per step 210 of FIG. 11. The method begins at step 240 where the payment entity device enters a loop for each of the accounts payable in the accounts payable data file or the altered accounts payable data file. For a first account payable, the method continues at step 242 where the payment entity device determines an invoice number, creditor information (e.g., name, account number(s), address, etc.), identification of acquired goods or services, debt amount, alternate payment terms, and/or a payment date.

The method continues at step 244 where the payment entity device accesses the payables profile based on the creditor information to retrieve associated payment data for a creditor. Note that if the accounts payable data file includes an alternate payment scheme for the given creditor, the payment entity will reconcile the alternate payment scheme with the payment profile of the payables profile. For example, if the alternate payment scheme specifies an alternate payment date, the payment entity device would use the alternate payment date instead of the payment date of the payables profile, but would use the other information in the payables profile (e.g., method of payment, financial institution, etc.).

The method continues at step 246 where the payment entity device sets up a payment (e.g., creates payment data) for the account payable in accordance with the associated payment data retrieved from the payables profile and/or the alternate payment scheme data for the acquired goods or services to be executed on or about the payment date. An example of this processing is provide with reference to FIG. 7. The method continues at step 248 where the payment entity repeats the loop 240 until the last or a designated (e.g., a certain number) accounts payable is reached.

FIG. 14 is a logic diagram of an embodiment of an extension of the embodiment of the method of FIG. 11. The extension method includes steps 250-254 and steps 256-262. At step 250 the payment entity device receives payment transaction data for each of the accounts payable from one or more financial institution devices. The payment transaction data is essentially a receipt that the account payable has been paid and includes one or more of: information as to the amount paid, the payment date, the payee, the payee account number, the payer account number, the payer name, identity of the issuing financial institution, etc.

The method continues at step 252 where the payment entity device compiles the payment transaction data into payment categories. The payment categories may be sort terms that sort the payment transaction data into a desired format. For example, the payment transaction data may be sorted based on creditor, based on accounts payable, based on type of goods and/or services, payment method, etc. Further categorization may be made based on client, the financial institution making the payment, the financial institution receiving the payment, etc.

The method continues at step 254 where the payment entity device generates one or more payment report in accordance with the payment categories. For example, the payment entity device may generate one or more reports for the client that functions as a settlement statement regarding the most recent accounts payable data file, may generate a report indicating alternate payment methods that were used, may generate a report identifying alternate creditors for similar type goods and/or services, etc. As another example, the payment entity device may generate a report for one or more of the client's financial institutions and/or a report for one or more financial institutions receiving payment.

At step 256, the payment entity device requests updated or new payment program information from a plurality of financial institution devices. For example, the payment entity device communicates with a plurality of financial institutions to acquire new, modified, or deleted payment programs they are offering. For each new, modified, or deleted payment program, the payment entity device updates its list of payment method programs. A payment method program may include information regarding the type of payment (e.g., check, wire transfer, debit account, credit card, etc.), associated transactional fees, payment terms, bonuses, rewards, volume discounts, interest rates, etc.

The method continues at step 260 where the payment entity device receives, from one or more of the plurality of financial institution devices, updated or new payment program data. The method continues at step 262 where the payment entity device stores the updated or new payment program data.

Figure 15:
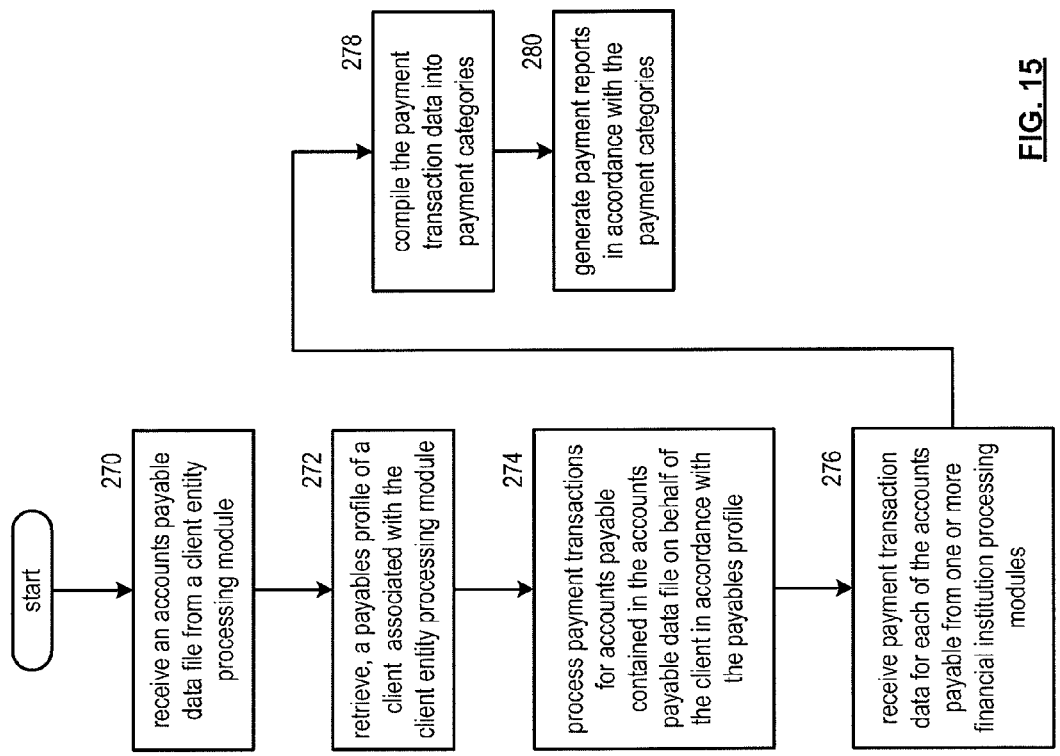
FIG. 15 is a logic diagram of another embodiment of a method for processing an accounts payable data file based on a payables profile in accordance with the present invention.

FIG. 15 is a logic diagram of another embodiment of a method for processing an accounts payable data file based on a payables profile that begins at step 270 where the payment entity device receives an accounts payable data file from a client device. The method continues at step 272 where the payment entity device retrieves a payables profile of a client associated with the client device. The payables profile includes a file containing a plurality of creditors and at least one associated payment scheme for each of the plurality of creditors. The associated payment scheme indicates a method for paying at least a portion of debt owed to the creditor via at least one of: a client credit card, a funds transfer, commercial paper, tangible consideration, and a debit account.

In an embodiment, the retrieving the payables profile includes determining whether the payables profile is to be modified. When the payables profile is to be modified, accessing a section of the accounts payable data file to retrieve altered associated payment data for at least one creditor. The payment entity then temporarily replaces associated payment data of the payables profile with the altered associated payment data. Note that the associated payment data includes at least one payment scheme for paying at least a portion of debt owed to the one of the plurality of creditors via at least one of: a client credit card, a funds transfer, commercial paper, tangible consideration, and a debit account.

The method continues at step 274 where the payment entity device processes payment transactions for accounts payable contained in the accounts payable data file on behalf of the client in accordance with the payables profile. In an embodiment, the payment entity device processes the payment transactions by determining, from the accounts payable data file, at least some of: invoice number, creditor information, identification of acquired goods or services, debt amount, and payment date for an account payable of the accounts payable. The payment entity device then accesses the payables profile based on the creditor information to retrieve associated payment data for a creditor. The payment entity device the sets up a payment for the account payable in accordance with the associated payment data for the acquired goods or services to be executed on or about the payment date.

In another embodiment, the payment entity device processes the payment transactions by determining associated payment data from the payables profile for a creditor of an account payable of the accounts payable. Note that the associated payment data includes at least one payment scheme for paying at least a portion of debt owed to the creditor of the account payable via at least one of: a client credit card, a funds transfer, commercial paper, tangible consideration, and a debit account. The payment entity device then compares the at least one payment scheme with a plurality of payment programs and, when at least one of the plurality of payment programs compares favorably to a payment scheme of the at least one payment scheme, utilizes the at least one of the plurality of payment programs instead of the payment scheme.

The method continues at step 276 where they payment entity device receives payment transaction data for each of the accounts payable from one or more financial institution devices. The method continues at step 278 where the payment entity device compiles the payment transaction data into payment categories. The method then continues at step 280 where the payment entity device generates payment reports in accordance with the payment categories.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method performed by a computing device, the method comprising:
   receiving, by the computing device, an accounts payable data file for a client that pays a plurality of creditors, wherein the accounts payable data file includes a plurality of accounts payable entries, and wherein the plurality of accounts payable entries includes associated creditor information;
   determining, by the computing device, payment schemes for the plurality of accounts payable entries, wherein the payment schemes are determined based on the received accounts payable data file and a stored payables profile for the client;
   determining, by the computing device, whether the client is associated with a first level of service or a second level of service;
   initiating, by the computing device, payment transactions for the plurality of accounts payable entries,
   wherein if the determined level of service is the first level of service, initiating the payment transactions comprises generating payment requests in accordance with the payment schemes determined based on the received accounts payable data file and the stored payables profile for the client,
   wherein if the determined level of service is the second level of service, initiating the payment transactions comprises:
      analyzing payment program data;
      determining a more optimal payment scheme based on the payment program data; and
      generating the payment requests in accordance with the more optimal payment scheme; and
   transmitting, by the computing device, the payment requests to a financial institution device.

2. The method of claim 1, wherein the computing device is a payment entity device configured to facilitate payment and reconciliation of accounts payable.

3. The method of claim 1, wherein the computing device is a client device operated by the client.

4. The method of claim 1, wherein the payment schemes include one or more of: a credit account, a debit account, a funds transfer, commercial paper, and monetary consideration.

5. The method of claim 1, wherein the first level of service corresponds to a basic account selected by the client during an enrollment process, and wherein the second level of service corresponds to an advanced account selected by the client during the enrollment process.

6. The method of claim 1, wherein the payment program data includes a list of financial institutions and corresponding payment types processed by the financial institutions.

7. The method of claim 6, wherein the payment program data further includes one or more of: processing fees, interest rates, reward programs, and rebates associated with the payment types processed by the financial institutions.

8. The method of claim 1, wherein if the determined level of service is the second level of service, initiating the payment transactions further comprises:
   providing the more optimal payment scheme to the client as a recommendation; and
   receiving a selection from the client of the more optimal payment scheme before generating the payment requests in accordance with the more optimal payment scheme.

9. The method of claim 1, wherein if the determined level of service is the second level of service, the payment requests are automatically generated in accordance with the more optimal payment scheme.

10. The method of claim 1, wherein if the determined level of service is the second level of service, the stored payables profile for the client is modified to reflect the more optimal payment scheme.

11. A computing device comprising:
   a processor; and
   a memory coupled to the processor, wherein the memory comprises code executable by the processor for implementing a method comprising:
      receiving, by the computing device, an accounts payable data file for a client that pays a plurality of creditors, wherein the accounts payable data file includes a plurality of accounts payable entries, and wherein the plurality of accounts payable entries includes associated creditor information;
      determining, by the computing device, payment schemes for the plurality of accounts payable entries, wherein the payment schemes are determined based on the received accounts payable data file and a stored payables profile for the client;
      determining, by the computing device, whether the client is associated with a first level of service or a second level of service;
      initiating, by the computing device, payment transactions for the plurality of accounts payable entries,
      wherein if the determined level of service is the first level of service, initiating the payment transactions comprises generating payment requests in accordance with the payment schemes determined based on the received accounts payable data file and the stored payables profile for the client,
      wherein if the determined level of service is the second level of service, initiating the payment transactions comprises:
         analyzing payment program data;
         determining a more optimal payment scheme based on the payment program data; and
         generating the payment requests in accordance with the more optimal payment scheme; and
      transmitting, by the computing device, the payment requests to a financial institution device.

12. The computing device of claim 11, wherein the computing device is a payment entity device configured to facilitate payment and reconciliation of accounts payable.

13. The computing device of claim 11, wherein the computing device is a client device operated by the client.

14. The computing device of claim 11, wherein the payment schemes include one or more of: a credit account, a debit account, a funds transfer, commercial paper, and monetary consideration.

15. The computing device of claim 11, wherein the first level of service corresponds to a basic account selected by the client during an enrollment process, and wherein the second level of service corresponds to an advanced account selected by the client during the enrollment process.

16. The computing device of claim 11, wherein the payment program data includes a list of financial institutions and corresponding payment types processed by the financial institutions.

17. The computing device of claim 16, wherein the payment program data further includes one or more of: processing fees, interest rates, reward programs, and rebates associated with the payment types processed by the financial institutions.

18. The computing device of claim 11, wherein if the determined level of service is the second level of service, initiating the payment transactions further comprises:
providing the more optimal payment scheme to the client as a recommendation; and
receiving a selection from the client of the more optimal payment scheme before generating the payment requests in accordance with the more optimal payment scheme.

19. The computing device of claim 11, wherein if the determined level of service is the second level of service, the payment requests are automatically generated in accordance with the more optimal payment scheme.

20. The computing device of claim 11, wherein if the determined level of service is the second level of service, the stored payables profile for the client is modified to reflect the more optimal payment scheme.

* * * * *